US008267558B1

(12) United States Patent
Glater

(10) Patent No.: US 8,267,558 B1
(45) Date of Patent: Sep. 18, 2012

(54) LIGHT ROTATION ASSEMBLY

(75) Inventor: Michael Glater, Brooklyn, NY (US)

(73) Assignee: B/E Aerospace, Inc., Wellington, FL (US)

( * ) Notice: Subject to any disclaimer, the term of this patent is extended or adjusted under 35 U.S.C. 154(b) by 235 days.

(21) Appl. No.: 12/569,107

(22) Filed: Sep. 29, 2009

Related U.S. Application Data

(60) Provisional application No. 61/102,411, filed on Oct. 3, 2008.

(51) Int. Cl.
*B60Q 3/02* (2006.01)
*F21S 8/02* (2006.01)
(52) U.S. Cl. ......... 362/490; 362/528; 362/421; 362/287
(58) Field of Classification Search .................... 362/35, 362/269, 470, 471, 371, 287, 288, 372, 421, 362/490, 528
See application file for complete search history.

(56) References Cited

U.S. PATENT DOCUMENTS

| | | | | | |
|---|---|---|---|---|---|
| 3,912,918 | A | * | 10/1975 | Feinbloom | 362/581 |
| 5,377,087 | A | * | 12/1994 | Yoon | 362/275 |
| 5,560,707 | A | * | 10/1996 | Neer | 362/376 |
| 6,115,068 | A | * | 9/2000 | Ariga et al. | 348/373 |
| 6,371,628 | B1 | * | 4/2002 | Ward | 362/287 |
| 6,578,994 | B1 | * | 6/2003 | Beyerlein | 362/490 |
| 7,566,154 | B2 | * | 7/2009 | Gloisten et al. | 362/545 |
| 7,654,705 | B2 | * | 2/2010 | Czech et al. | 362/364 |
| 7,862,197 | B2 | * | 1/2011 | Gebhard | 362/191 |

* cited by examiner

*Primary Examiner* — Peggy A. Neils
(74) *Attorney, Agent, or Firm* — Drinker Biddle & Reath LLP

(57) ABSTRACT

A light fixture for and method of rotating a rotatable light source. The light fixture having a flange with a rotating member positioned within the flange. The rotating member houses a light source. A first self-lubricating ring is located proximal to the front of the flange and at least partially encircles the rotating member. A second self-lubricating ring is located distal to the front of the flange and also at least partially encircles the rotating member. A compression device, held in place by a retaining ring, is located behind the second self-lubricating ring.

21 Claims, 3 Drawing Sheets

LIGHT ROTATION ASSEMBLY

CROSS-REFERENCE TO RELATED PATENT APPLICATION

This patent application claims the benefit of U.S. Provisional Patent Application No. 61/102,411, filed Oct. 3, 2008.

FIELD OF THE INVENTION

This invention pertains to a light fixture for a rotatable light source and, more particularly, to a light fixture for a rotating light source located in a vehicle.

BACKGROUND OF THE INVENTION

Conventional light fixtures that allow for rotation of the light source utilize a flange member that is spherically machined to match the rotating member in which the light source is located. Such conventional light sources utilize felt ribbons placed between the rotating member and the flange to minimize friction between the rotating member and the inner surface of the flange. Springs are installed radially over the felt to prevent the rotating member from rotating loosely in the flange.

With normal wear and tear the felt edges tend to fray and break down resulting in direct contact between the inner surface of the flange and the outer surface of the rotating member. Galling and flaking of the contacting surfaces often occurs. This causes the surfaces to scrape or stick when the rotating member is rotated by a user. In addition, the felt is often applied by adhesive. Over time the adhesive tends to breakdown causing the felt to bunch-up when the rotating member is rotated. This results in the rotating member sticking when a user attempts to rotate the light.

In addition, these conventional rotating light fixtures require specially machined mating flanges. The machining of these flanges so that the inner surface of the sidewall of the flange mirrors the outer surface of the rotating member substantially increases the costs of production for such light fixtures.

A need therefore exists for a more effective and efficient light fixture that is capable of allowing smooth rotation of the light source without the galling and flaking problems of the conventional light fixtures and without the need to specially machine matching parts.

BRIEF SUMMARY OF THE EMBODIMENTS

An exemplary embodiment of the present invention provides a light fixture for a rotatable light source. The light fixture is comprised of a flange with a rotating member positioned within the flange. The rotating member houses a light source. A first self-lubricating ring is located proximal to the front of the flange and surrounds the rotating member. A second self-lubricating ring is located distal to the front of the flange and also surrounds the rotating member while a wave spring and a retaining ring are located behind the second self-lubricating ring.

As described in more detail herein, a light fixture according to another exemplary embodiment of the present invention comprises a flange including a sidewall, a rotating member surrounding a lighting device, a primary self-lubricating ring and a compression device. The rotating member is disposed in a cavity defined by the flange. The primary self-lubricating ring at least partially encircles the rotating member and is disposed between the rotating member and the sidewall of the flange. The compression device is positioned to exert a force compressing the primary self-lubricating ring against the rotating member.

Yet another embodiment of the invention is a method of rotating a lighting fixture. The method comprising providing a rotatable lighting device disposed in a generally cylindrical flange, wherein first and second self-lubricating rings are disposed between the lighting device and the flange, providing a compression device adjacent to the second ring, the compression device exerting a force on the second ring, overcoming a load exerted by the second ring on the rotatable lighting device, and rotating the lighting device by sliding the lighting device across at least one of the self-lubricating rings

BRIEF DESCRIPTION OF THE DRAWINGS

These and other advantages of the invention will be apparent from the description of the invention provided herein with reference to the attached drawings in which.

DETAILED DESCRIPTION OF THE EMBODIMENTS

Figure 1:
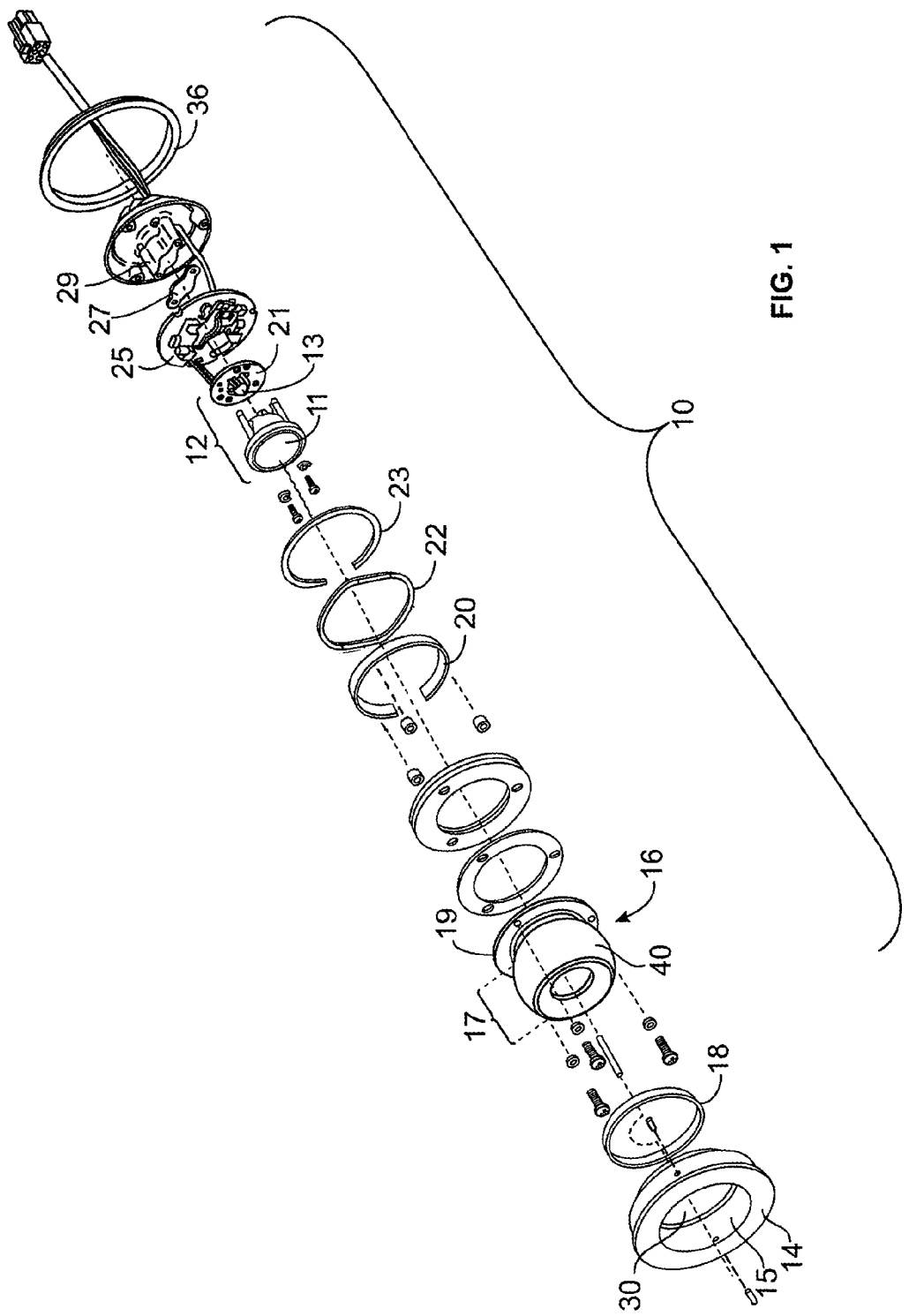
FIG. 1 is an exploded view of a light fixture for a rotatable light source.
Figure 2:
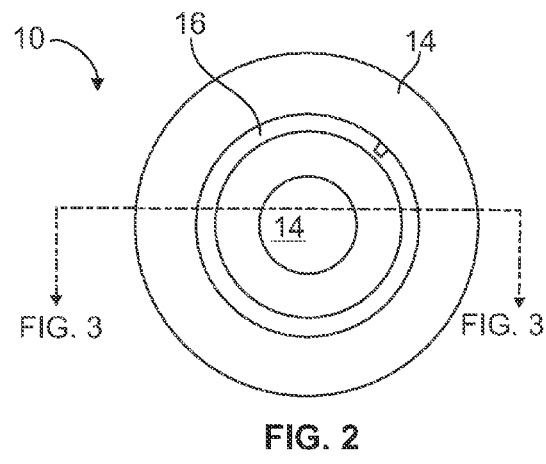
FIG. 2 is a top view of a light fixture for a rotatable light source.
Figure 3:
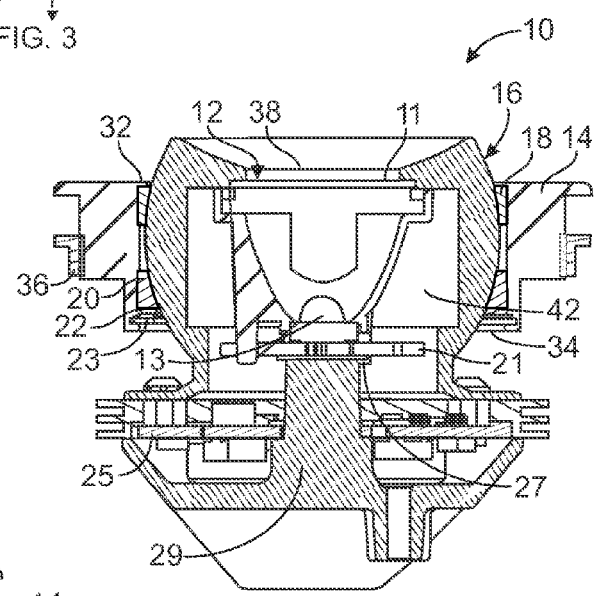
FIG. 3 is a sectional view of a light fixture taken along line A-A of FIG. 2.
Figure 4:
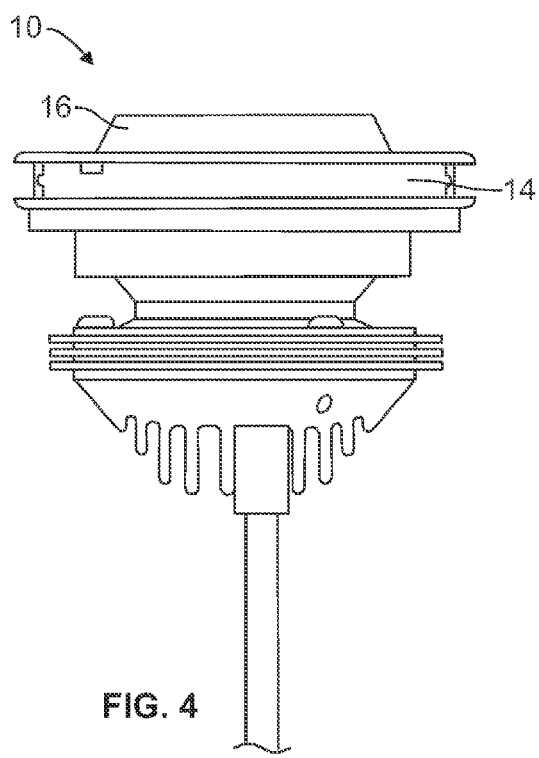
FIG. 4 is a side view of a light fixture.
Figure 5:
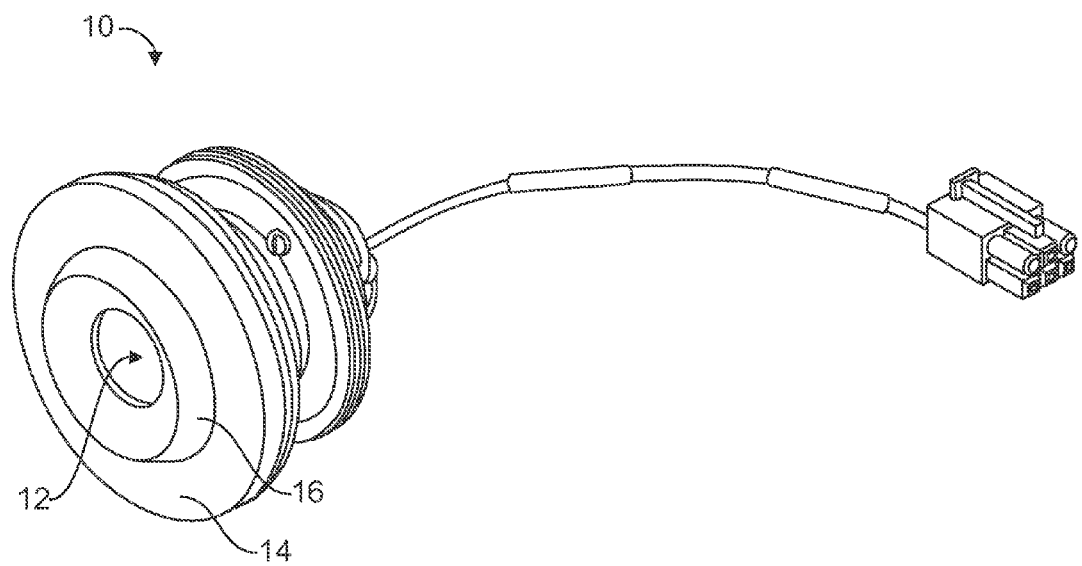
FIG. 5 is a perspective view of a light fixture for a rotatable light source.

The embodiments of the invention described below are not intended to be exhaustive or to limit the invention to the precise structure and operation disclosed. Rather, the embodiments described in detail below have been chosen and described to explain the principles of the invention and its application, operation and use in order to best enable others skilled in the art to follow its teachings.

FIGS. 1-5 illustrate an exemplary light fixture 10 for a rotatable light source 12 according to an embodiment of the present invention. As shown in FIGS. 1-5, the light fixture 10 is comprised of a flange 14 with a rotating member 16 housing the light source 12 positioned within the flange 14. In the preferred embodiment, the flange 14 includes a cylindrical sidewall 15 and front and back lips 32, 34. The front lip 32 (FIG. 3) is disposed at the front of the flange 14 and the back lip 34 is disposed at the back of the flange 14. The front and back lips 32, 34 may be generally perpendicular to the flange sidewall 15. The flange 14, however, is not limited to a particular shape or contour. The flange 14 defines a cavity 30 in which the rotating member 16 is at least partially disposed. In the preferred embodiment, the cavity 30 is also cylindrical. The shape and contour of the cavity 30 are not limited to being cylindrical and may be other shapes and geometries or combinations thereof.

As best seen in FIG. 1, the rotating member 16 is comprised of a cover section 17 and a base section 19. The cover section defines a cavity 42 in which it houses at least a portion of the light source 12 and its len(s). The base section 19 is attached, distal from the front of the flange 14, to the cover section 17. The outer surface 40 of the cover section may be any shape, but in the preferred embodiment, illustrated in FIGS. 1 and 3, the outer surface 40 of the cover section 17 may be generally ball or spherical shaped. The cavity formed by the rotating member 16 may be of any geometry in which a light source 12 may be positioned.

Figure 6:
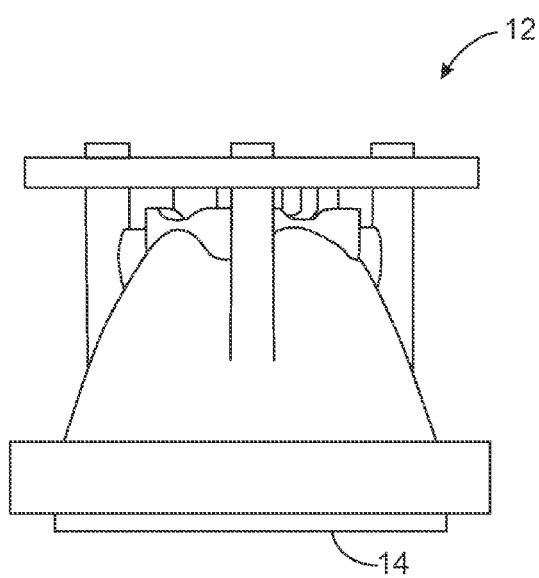
FIG. 6 is a side view of an embodiment of a light source for use in a rotatable light fixture.

The light source 12 (see FIGS. 1, 3 and 6) comprises a light 13. In a preferred embodiment the light source 12 also includes a first lens 11 and more preferably a second lens 38. The light source 12 may also include a printed circuit board 21 mounted to the light 13 and, in some embodiments, a second printed circuit board 25 for additional components of the lighting circuitry. The light 13 and the printed circuit board 21 may be mounted to a heat sink 29 and a pad 27 may, in some embodiments, be positioned between the light 13 (and the printed circuit board 21) and the heat sink 29. In the preferred embodiment, the light 13 may be one or more LEDs. In other embodiments, other types of lights may be used. The light 13 may be white or colored or a combination thereof.

A first self-lubricating ring 18 is disposed between the rotating member 16 and the sidewall 15 of the flange 14. More specifically, the first self-lubricating ring 18 may be disposed between the cover section 17 of the rotating member 16 and the sidewall 15. The first self-lubricating ring 18 may be disposed proximal to the front of the flange 14 and at least partially encircles the rotating member 16. In the preferred embodiment, the first self-lubricating ring 18 substantially encircles the outer surface of the cover section 17 of the rotating member 16 and is located adjacent to the front lip 32 of the flange 14. In the most preferred embodiment, the first self-lubricating ring 18 completely encircles the outer surface of the cover section 17 of the rotating member 16.

A second self-lubricating ring 20 is disposed between the rotating member 16 and the sidewall 15 of the flange 14. More specifically, the second self-lubricating ring 20 may be disposed between the cover section 17 of the rotating member 16 and the sidewall 15. The second self-lubricating ring 20 may be disposed distal to the flange 14 and at least partially encircling the rotating member 16. In a preferred embodiment, the second self-lubricating ring 20 may be split, as shown in FIG. 1, and substantially encircles the outer surface 40 of the cover section 17 of the rotating member 16. In this preferred embodiment, the second self-lubricating ring 20 may be located proximal to the back lip 34. In an alternative embodiment, first self-lubricating ring 18 may be eliminated and only the second self-lubricating ring 20 may be present.

The self-lubricating rings 18, 20 can be constructed of polyethylene or Delrin® with 20% Teflon® to eliminate the need for lubrication or felt pads between the rotating member 16 and the interior of the flange 14. The use of Delrin® or another lubricious material contributes to the improved reliability and efficiency of this rotating light because it substantially eliminates galling and flaking contamination and sticking between surfaces and other problems inherent in the conventional prior art.

A compression device 22 is located behind the second self-lubricating ring 20. In the preferred embodiment, the compression device is a wave spring. A retaining ring 23 may be positioned in a groove in the flange 14 and retains the compression device 22 around the cover section 17 of the rotating member 16. The compression device 22 exerts a downward load on the second self-lubricating ring 20 pushing the second self-lubricating ring 20 snugly between the sidewall 15 of the flange 14 and the cover section 17 of the rotating member 16. As such, the second self-lubricating ring 20 exerts a load on the cover section 17 of the rotating member 16 thus holding the rotating member 16 in place and preventing it from freely rotating in the flange cavity 30. In embodiments with first self-lubricating ring 18 also included (the preferred embodiments), the downward force from the second self-lubricating ring 20 pushes the rotating member 16 snugly against the first self-lubricating ring 18 and therefore further inhibits the rotating member 16 from freely rotating in the flange cavity 30.

When in operation, the light fixture 10 is connected in any known conventional way to a power source such as a 28V DC power source found in an aircraft. In order to orient the light beam in a particular direction, the user rotates the rotating member 16 clockwise or counterclockwise. The force applied by the user to rotate the rotating member 16 overcomes the load exerted by the second ring on the cover section 17 of the rotating member 16. As the rotating member 16 rotates on its axis, it slides across the self-lubricating rings 18, 20. The amount of force required to rotate the rotating member 16 is controlled by the amount of force the wave spring 22 exerts on the second self-lubricating ring 20 and the resultant forces exerted by the first and second self-lubricating rings 18, 20 on the rotating member 16.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A light fixture for a rotatable light source, the light fixture comprised of:
    a flange;
    a rotating member housing a light source positioned within the flange;
    a first self-lubricating ring encircling the rotating member and disposed between the rotating member and the flange, the first self-lubricating ring being proximal to the front of the flange;
    a second self-lubricating ring encircling the rotating member and disposed between the rotating member and the flange, the second self-lubricating ring being distal to the front of the flange; and
    a wave spring located behind the second self-lubricating ring and distal to the front of the flange, the wave spring compressing the second self-lubricating ring between the rotating member and the flange to reduce free rotation of the rotating member when the rotating member is not being purposefully rotated.

2. The light fixture of claim 1, wherein the rotating member has a generally ball-shaped outer cover.

3. The light fixture of claim 1, further comprising a retaining ring disposed around the wave spring.

4. The light fixture of claim 1, wherein the first and second self-lubricating rings are a polyethylene material.

5. A light fixture comprising:
a flange including a sidewall, the flange defining a cavity;
a rotating member surrounding a lighting device, the rotating member disposed in the flange;
a primary self-lubricating ring at least partially encircling the rotating member and disposed between the rotating member and the sidewall of the flange; and
a resilient compression device that is compressible in a longitudinal direction that exerts a force compressing the primary ring against the rotating member.

6. The light fixture of claim 5, wherein the flange defines a generally cylindrical cavity.

7. The light fixture of claim 6, further comprising a secondary self-lubricating ring encircling the rotating member and disposed between the rotating member and the sidewall of the flange.

8. The light fixture of claim 7, wherein the flange further comprises a front lip disposed at the front of the flange and a back lip disposed at the back of the flange, wherein the front and back lips are generally perpendicular to the flange sidewall.

9. The light fixture of claim 8, wherein the secondary self-lubricating ring is adjacent to the front lip.

10. The light fixture of claim 9, wherein the primary self-lubricating ring is disposed proximal to the back lip.

11. The light fixture of claim 7, wherein the compression device is a wave spring.

12. The light fixture of claim 7, wherein the first and second self-lubricating rings are a polyethylene material.

13. The light fixture of claim 7, wherein the rotating member includes a generally spherically shaped cover section.

14. The light fixture of claim 13, wherein the lighting device further comprises a an LED light source and a lens attached to the lighting device.

15. The light fixture of claim 14, wherein the LED light source is mounted on a printed circuit board.

16. The light fixture of claim 15, further comprising a heat sink mounted to the printed circuit board.

17. A method of rotating a lighting fixture including a rotatable lighting device disposed in a generally cylindrical flange, wherein first and second self-lubricating rings are disposed between the lighting device and the flange, and a resilient compression device adjacent to the second ring, the method comprising:
exerting a force on the second ring by the resilient compression device by compressing it in a longitudinal direction;
overcoming a load exerted by the second ring on the rotatable lighting device; and
rotating the lighting device by sliding the lighting device across at least one of the self-lubricating rings.

18. The method of claim 17, wherein the compression device is a wave spring.

19. The method of claim 17, wherein the first and second self-lubricating rings are a polyethylene material.

20. The method of claim 17, wherein the rotatable lighting device includes a generally spherical cover section.

21. The light fixture of claim 1, wherein the flange comprises a front lip disposed at the front of the flange and a back lip disposed at the back of the flange, the front and back lips being generally perpendicular to the sidewall of the cavity, the first self-lubricating ring being disposed against the front lip, and the wave spring being disposed between the second self-lubricating ring and the back lip.

\* \* \* \* \*